(12) United States Patent
Bao et al.

(10) Patent No.: US 8,610,727 B1
(45) Date of Patent: Dec. 17, 2013

(54) DYNAMIC PROCESSING CORE SELECTION FOR PRE- AND POST-PROCESSING OF MULTIMEDIA WORKLOADS

(75) Inventors: Jia Bao, Shanghai (CN); Ke Ding, Shanghai (CN); Premanand Sakarda, Acton, MA (US)

(73) Assignee: Marvell International Ltd., Hamilton (BM)

( * ) Notice: Subject to any disclaimer, the term of this patent is extended or adjusted under 35 U.S.C. 154(b) by 755 days.

(21) Appl. No.: 12/404,777

(22) Filed: Mar. 16, 2009

Related U.S. Application Data

(60) Provisional application No. 61/036,657, filed on Mar. 14, 2008.

(51) Int. Cl.
*G06F 15/16* (2006.01)

(52) U.S. Cl.
USPC .......................................... 345/502; 345/503

(58) Field of Classification Search
USPC .................................. 345/503, 502
See application file for complete search history.

(56) References Cited

U.S. PATENT DOCUMENTS

2001/0040505 A1* 11/2001 Ishida et al. ................... 340/435
2007/0171229 A1* 7/2007 Mamiya et al. ............... 345/503
2009/0006036 A1* 1/2009 Luick ............................. 702/186
2009/0109230 A1* 4/2009 Miller et al. .................. 345/506
2009/0204837 A1* 8/2009 Raval et al. ................... 713/330

OTHER PUBLICATIONS

U.S. Appl. No. 12/400,604, filed Mar. 9, 2009; An Adaptive Closed-Loop Chip Power Predictor in a Power Management; Yu Bai et al.; 24 pages.

* cited by examiner

*Primary Examiner* — Said Broome
*Assistant Examiner* — Peter Hoang

(57) ABSTRACT

Apparatus having corresponding methods comprise a processing core performance monitoring module adapted to receive indications of performance levels of a plurality of processing cores, the plurality of processing cores comprising a central processing unit (CPU), a video accelerator, and a graphics accelerator; a video accelerator performance monitoring module adapted to receive an indication of a performance level of the video accelerator; a graphics accelerator performance monitoring module adapted to receive an indication of a performance level of the graphics accelerator; and a processor core management module adapted to dynamically allocate at least one of a pre-processing task and a post-processing task of a multimedia workload to any one of the video accelerator, the graphics accelerator, and the CPU-processing cores based on the performance levels of the video accelerator, the graphics accelerator, and the CPU.

20 Claims, 3 Drawing Sheets

DYNAMIC PROCESSING CORE SELECTION FOR PRE- AND POST-PROCESSING OF MULTIMEDIA WORKLOADS

CROSS-REFERENCE TO RELATED APPLICATIONS

This application claims the benefit of U.S. Provisional Patent Application Ser. No. 61/036,657, filed on Mar. 14, 2008, the disclosure thereof incorporated by reference herein in its entirety.

BACKGROUND

The present disclosure relates generally to multimedia processing. More particularly, the present disclosure relates to pre-processing and post-processing of multimedia workloads.

As multimedia becomes more prevalent and pervasive on consumer electronic devices such as smart phones, personal digital players, portable multimedia players, digital picture frames, portable navigation devices, Internet media player and other such devices, the demand for processing and multimedia accelerators increases. Hence, in a typical system-on-a-chip (SoC), there are multiple processing cores for processing multimedia workloads. For example, the processing cores can include a central processing unit (CPU), a video accelerator, and a graphics accelerator.

According to conventional approaches, pre-processing and post-processing of multimedia workloads is performed by the CPU, regardless of which processing core processes the multimedia workloads.

SUMMARY

The inventors have recognized that these pre-processing and post-processing tasks can be performed by processing cores other than the CPU, for example by video accelerators, graphics accelerators, and the like. One advantage of an allocation of a pre-processing or post-processing task to a processing core other than the CPU is a reduction in the workload of the CPU. Another advantage lies in the fact that a processing core other than the CPU can generally perform the task with much lower power consumption than the CPU.

In general, in one aspect, an embodiment features an apparatus comprising: a processing core performance monitoring module adapted to receive indications of performance levels of a plurality of processing cores, the plurality of processing cores comprising a central processing unit (CPU), a video accelerator, and a graphics accelerator; a video accelerator performance monitoring module adapted to receive an indication of a performance level of the video accelerator; a graphics accelerator performance monitoring module adapted to receive an indication of a performance level of the graphics accelerator; and a processor core management module adapted to dynamically allocate at least one of a pre-processing task and a post-processing task of a multimedia workload to any one of the video accelerator, the graphics accelerator, and the CPUprocessing cores based on the performance levels of the video accelerator, the graphics accelerator, and the CPU.

In general, in one aspect, an embodiment features a method comprising: receiving indications of performance levels of a plurality of processing cores, the plurality of processing cores comprising a central processing unit (CPU), a video accelerator, and a graphics accelerator; receiving an indication of a performance level of the CPU; receiving an indication of a performance level of the video accelerator; receiving an indication of a performance level of the graphics accelerator; and dynamically allocating at least one of a pre-processing task and a post-processing task of a multimedia workload to any one of the video accelerator, the graphics accelerator, and the CPUprocessing cores based on the performance levels of the video accelerator, the graphics accelerator, and the CPU.

In general, in one aspect, an embodiment features a computer program executable on a processing core of a computer comprising a plurality of the processing cores, the computer program comprising: instructions for receiving indications of performance levels of the processing cores; and instructions for dynamically allocating at least one of a pre-processing task and a post-processing task of a multimedia workload to one of the processing cores based on the performance levels. In some embodiments, the plurality of processing cores comprises a central processing unit (CPU), a video accelerator, and a graphics accelerator, and the computer program further comprises: instructions for receiving an indication of a performance level of the CPU; instructions for receiving an indication of a performance level of the video accelerator; instructions for receiving an indication of a performance level of the graphics accelerator; and instructions for dynamically allocating the at least one of the pre-processing task and the post-processing task of the multimedia workload to one of the video accelerator, the graphics accelerator, and the CPU based on the performance levels.

The details of one or more implementations are set forth in the accompanying drawings and the description below. Other features will be apparent from the description and drawings, and from the claims.

Figure 1:
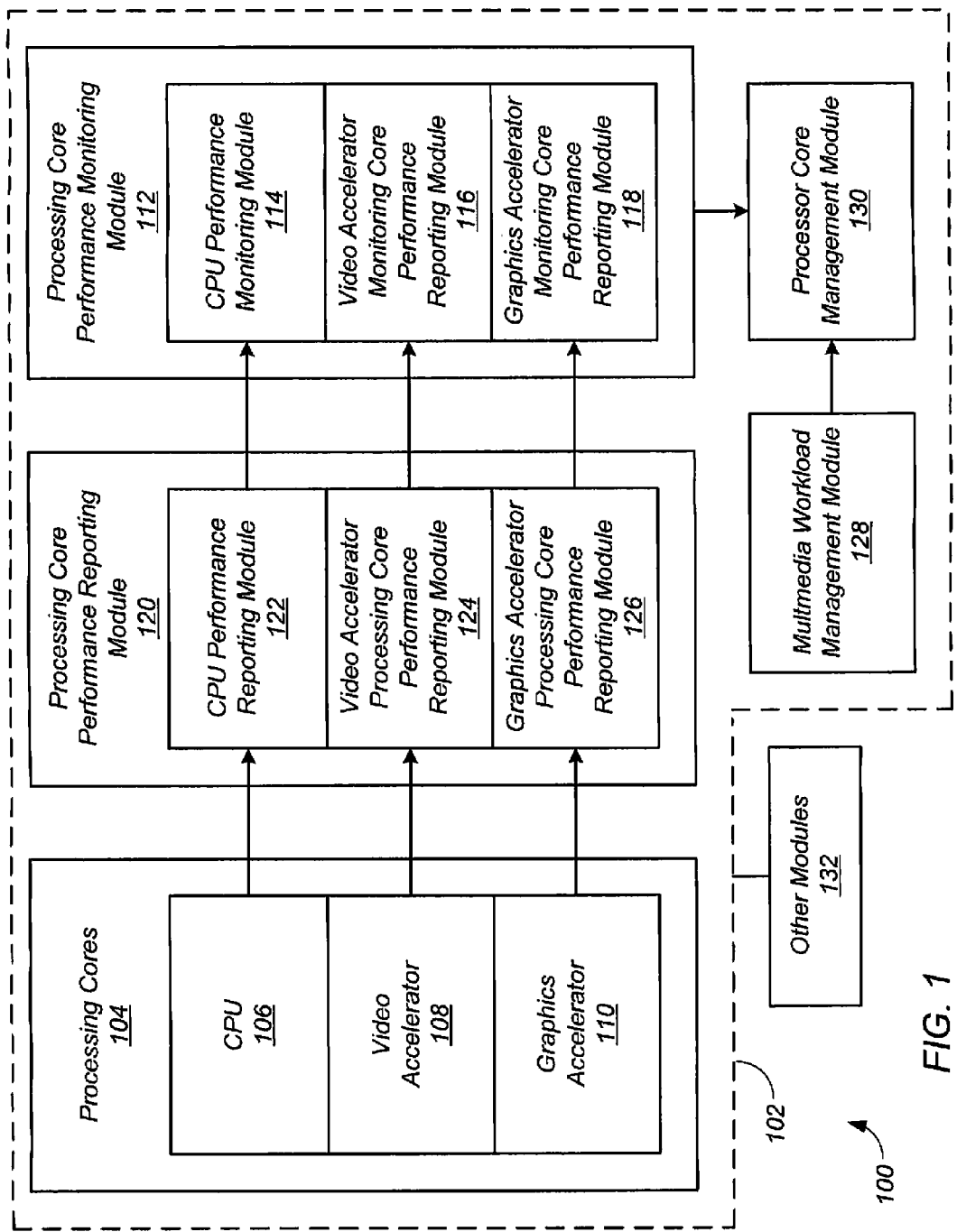
FIG. 1 shows elements of a processing device according to one embodiment.

The leading digit(s) of each reference numeral used in this specification indicates the number of the drawing in which the reference numeral first appears.

DETAILED DESCRIPTION

Embodiments of the present disclosure provide elements of a method to dynamically detect each multimedia workload and appropriately select processing cores for pre-processing and post-processing of the multimedia workload. Various embodiments include receiving indications of performance levels of a plurality of processing cores and dynamically allocating the pre-processing and/or post-processing of a multimedia workload to one of the processing cores based on the performance levels. The term "dynamically" is used to indicate that the allocation occurs during runtime.

FIG. 1 shows elements of a processing device 100 according to one embodiment. As used herein, the term "processing device" refers to any device comprising multiple processing cores capable of performing the functions described herein. Although in the described embodiments, the elements of processing device 100 are presented in one arrangement, other embodiments may feature other arrangements, as will be apparent to one skilled in the relevant arts based on the disclosure and teachings provided herein. For example, the elements of processing device 100 can be implemented in hardware, software, or combinations thereof.

Referring to FIG. 1, processing device 100 includes a system-on-a-chip (SoC) 102. But while various embodiments are described with reference to SoCs, the modules of the SoCs can be fabricated as multiple integrated circuits instead. As used herein, the term "module" refers to hardware, software, or any combination thereof.

SoC 102 includes a plurality of processing cores 104 including a central processing unit (CPU) 106, a video accelerator 108, and a graphics accelerator 110. SoC 102 further includes a processing core performance monitoring module 112 adapted to receive indications of the performance levels of processing cores 104. In particular, processing core performance monitoring module 112 includes a CPU performance monitoring module 114 adapted to receive indications of the performance levels of CPU 106, a video accelerator performance monitoring module 116 adapted to receive indications of performance levels of video accelerator 108, and a graphics accelerator performance monitoring module 118 adapted to receive indications of performance levels of graphics accelerator 110.

SoC 102 further includes a processing core performance reporting module 120 adapted to provide the indications of the performance levels of processing cores 104. In particular, processing core performance reporting module 120 includes a CPU performance reporting module 122 adapted to provide the indications of the performance levels of CPU 106, a video accelerator performance reporting module 124 adapted to provide the indications of performance levels of video accelerator 108, and a graphics accelerator performance reporting module 126 adapted to provide the indications of performance levels of graphics accelerator 110. Video accelerator performance reporting module 124 and graphics accelerator performance reporting module 126 can be implemented as device drivers capable of providing the desired performance indications.

SoC 102 further includes a multimedia workload monitoring module 128 adapted to detect multimedia workloads, and a processor core management module 130 adapted to dynamically allocate pre-processing tasks and post-processing tasks of the multimedia workloads to one of processing cores 104 based on the performance levels. Each of the tasks can be allocated to any processing core 104. Similar tasks for different multimedia workloads can be allocated to the same or different processing cores 104. The pre-processing tasks and post-processing tasks for a single multimedia workload can be allocated to the same or different processing cores 104.

Processing device 100 further includes other modules 132. Other modules 132 can include storage devices such as memories, hard drives, and the like, display devices, input devices such as keyboards, pointing devices, and the like, network interface, audio input and output devices, and so on. Some of the modules can be implemented on SoC 102 if desired.

Figure 2:
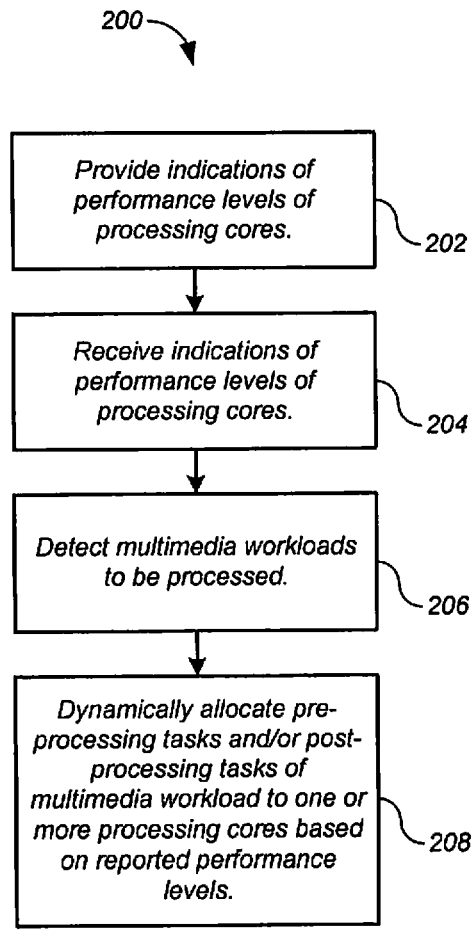
FIG. 2 shows a process for the processing device of FIG. 2 according to one embodiment.

FIG. 2 shows a process 200 for processing device 100 of FIG. 2 according to one embodiment. Although in the described embodiments, the elements of process 200 are presented in one arrangement, other embodiments may feature other arrangements. For example, in various embodiments, some or all of the steps of process 200 can be executed in a different order, concurrently, and the like.

Referring to FIG. 2, processing core performance reporting module 120 provides indications of performance levels of processing cores 104 (step 202). In particular, CPU performance reporting module 122 provides indications of the performance levels of CPU 106, video accelerator performance reporting module 124 provides indications of performance levels of video accelerator 108, and graphics accelerator performance reporting module 126 provides indications of performance levels of graphics accelerator 110.

Processing core performance monitoring module 112 receives the indications of the performance levels of processing cores 104 (step 204). In particular, CPU performance monitoring module 114 receives indications of the performance levels of CPU 106, video accelerator performance monitoring module 116 receives indications of performance levels of video accelerator 108, and graphics accelerator performance monitoring module 118 receives indications of performance levels of graphics accelerator 110.

The performance levels can represent processing performance, power consumption, and the like, and can be selected by configuring one or more profiling parameters. Processing performance can be measured by processor utilization, memory utilization, operating frequency, and the like. Processor utilization can be measured by instructions per second, operating system idle threads, and the like. Power consumption can be measured by current consumption, voltage levels, operating temperature, and the like. Other indications can be used as well. For example, one indication of performance is whether a multimedia workload is processor-bound or memory bound, that is, whether the workload is limited by the processor or memory. Other indications are contemplated. Many of these indications can be reported and monitored dynamically, that is, at runtime. Other indications can only be reported and monitored statically, that is, not at runtime. Both kinds of indications can be used by various embodiments.

The indications of performance levels are preferably collected periodically in sampling windows having configurable durations. Preferably the sampling windows are of the same duration and phase for all of the processing cores 104. The performance levels can include current performance, current available performance, predicted future performance, and the like. Processing performance can be predicted based on expected processor and/or memory utilization of expected future tasks. Power consumption can be predicted as well, for example as described in copending U.S. patent application Ser. No. 12/400,604 filed Mar. 9, 2009, entitled "An Adaptive Closed-Loop Chip Power Predictor In A Power Management Framework," the disclosure thereof incorporated by reference herein in its entirety.

Multimedia workload monitoring module 128 detects multimedia workloads to be processed (step 206). For example, the multimedia workloads can include video workloads, graphics workloads, speech recognition workloads, and the like, and encoding and decoding for those workloads. When a multimedia workload is detected, processor core management module 130 responds by dynamically allocating pre-processing tasks of the multimedia workload, post-processing tasks of the multimedia workload, or both, to one or more of processing cores 104 based on the reported performance levels (step 208). That is, processor core management module 130 dynamically allocates each of the pre-processing and/or post-processing tasks to CPU 106, video accelerator 108, or graphics accelerator 110 based on the performance levels. When CPU 106 has multiple cores, processor core management module 130 can dynamically allocate tasks to the cores individually.

The pre-processing tasks can include video stabilization, noise reduction, contrast enhancement, temporal filtering, and the like. The post-processing tasks can include deblocking filtering, deringing filtering, de-interlacing, clipping, resizing, rotating, and the like. Processor core management module 130 can base the dynamic allocation of tasks based on additional factors as well, for example including the type of multimedia workload.

Processor core management module 130 can dynamically allocate a task by generating a multimedia performance event that causes the context of the task to be mapped to the selected processing core 104. These events can trigger other changes, for example such as changing the speed of the memory bus, changing the frequency of one or more of the processing cores 104, and the like.

Processor core management module 130 can employ a look-up table to dynamically allocate the tasks. The look-up table can be generated according to predetermined policies, for example. Several entries from an example look-up table are presented in Table 1.

TABLE 1

| Multimedia Workload | CPU Utilization | Workload bound by: | Current Performance on Video Accelerator | Current Performance on Graphics Accelerator | Multimedia Performance Event |
|---|---|---|---|---|---|
| Graphics | 40% | CPU | 10% | 80% | Map context to Graphics Accelerator |
| Video decoding | 40% | CPU | 80% | 0% | Map context to Video Accelerator |
| Video encoding | 40% | CPU | 80% | 0% | Map context to Video Accelerator |
| Graphics and Video | 50% | CPU and Memory | 80% | 80% | Increase memory bus speed and map context to CPU |

Referring to Table 1, when a graphics workload is detected that is CPU-bound, where CPU utilization is 40%, current video accelerator performance is 10%, and current graphics accelerator performance is 80%, processor core management module 130 generates a multimedia performance event that maps the context of the pre-processing and/or post-processing of the multimedia workload to graphics accelerator 110. Referring to the next two entries in Table 1, when a video decoding or encoding workload is detected that is CPU-bound, where CPU utilization is 40%, current video accelerator performance is 80%, and current graphics accelerator performance is 0%, processor core management module 130 generates a multimedia performance event that maps the context of the pre-processing and/or post-processing of the multimedia workload to video accelerator 108. Referring to the last entry in Table 1, when a graphics and video workload is detected that is CPU-bound and memory-bound, where CPU utilization is 50%, current video accelerator performance is 80%, and current graphics accelerator performance is 80%, processor core management module 130 generates a multimedia performance event that maps the context of the pre-processing and/or post-processing of the multimedia workload to CPU 106 and increases the speed of the memory bus. Of course these are only a few entries for an example look-up table. Many other entries, and policies for generating the entries, are contemplated.

Figure 3:
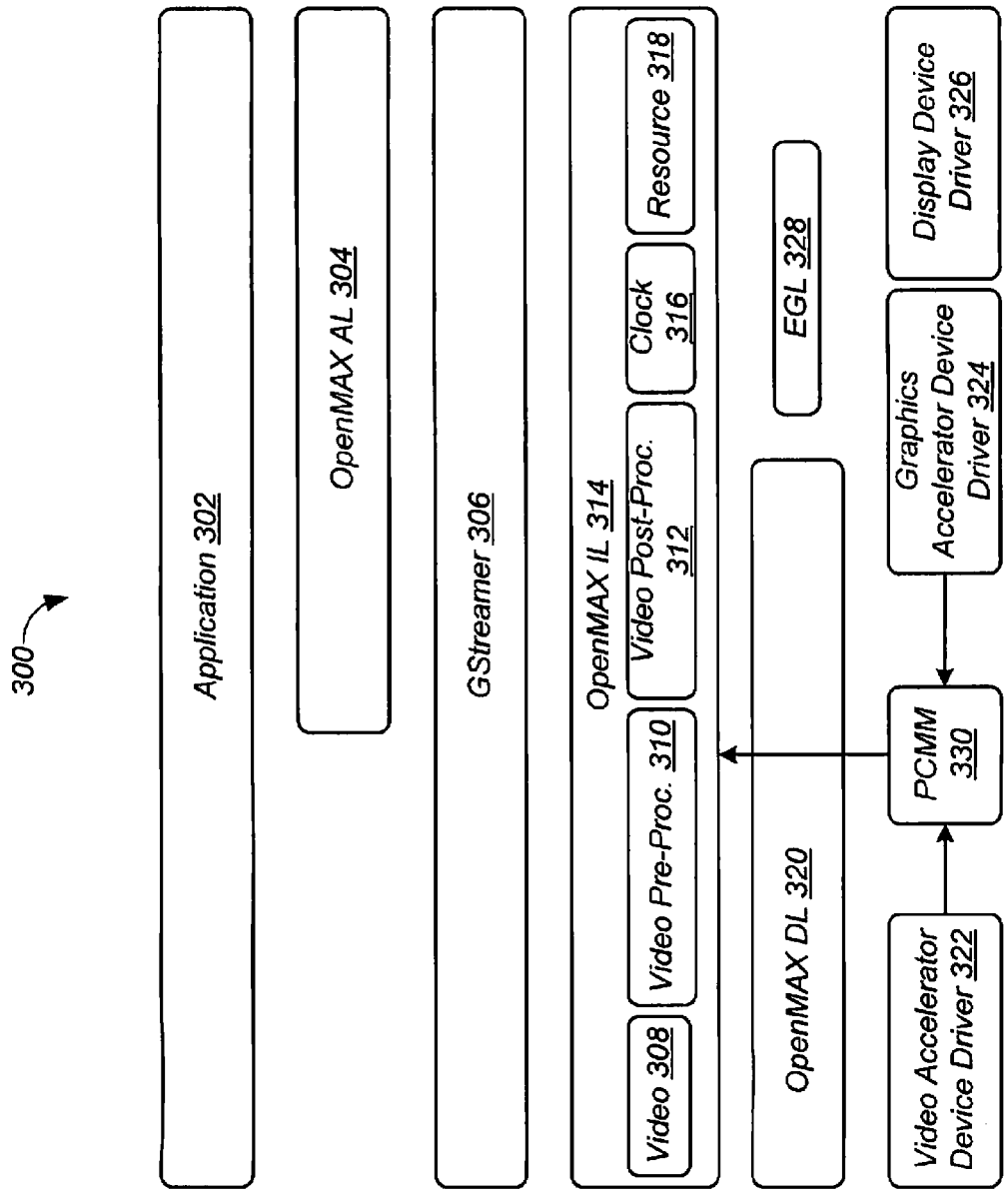
FIG. 3 shows an example video encode/decode software architecture for the processing device of FIG. 1 according to one embodiment.

FIG. 3 shows an example video encode/decode software architecture 300 for processing device 100 of FIG. 1 according to one embodiment. Software architecture 300 is adapted for a Linux system with OpenMAX and GStreamer. However, embodiments are also applicable to other operating systems including Windows Mobile, Windows XP, Symbian, and the like.

Referring to FIG. 3, an application 302 interfaces with lower-level building blocks either through an OpenMAX application layer (AL) interface 304 or a native GStreamer interface 306. Video encode/decode component 308, video pre-processing component 310, and video post-processing component 312 are implemented in an OpenMax integration component layer (IL) 314 together with other common components such as a clock component 316, resource components 318, and the like. Below IL layer 314, an OpenMAX development layer (DL) 320 is provided. Below DL layer 320 are device drivers including video accelerator device driver 322, graphics accelerator device driver 324, and display device driver 326. Also shown is an embedded-system graphics library (EGL) 328. In software architecture 300, video pre-processing and post-processing are usually flexible and can happen in many places in the system.

A processor core management module (PCMM) 330 is shown as well. Processor core management module 330 can be implemented as processor core management module 130 of FIG. 1, and can include the functions of multimedia workload monitoring module 128, processing core performance monitoring module 112, and CPU performance reporting module 122. The functions of video accelerator performance reporting module 124 can be included in video accelerator device driver 322, while the functions of graphics accelerator performance reporting module 126 can be included in graphics accelerator device driver 324.

Processor core management module 330 interfaces with OpenMAX IL layer 314, for example to detect multimedia workloads to be processed. Processor core management module 330 also gathers indications of performance from graphics accelerator device driver 324 and video accelerator device driver 322 as well as CPU 106 core(s). Based on these performance indications, processor core management module 330 generates multimedia performance events to OpenMAX IL layer 314 with maps of the processing context.

To accomplish these tasks, processor core management module 330 provides a plurality of application programming interfaces (APIs). Some example APIs, and their functions, are listed in Table 2.

TABLE 2

| API | Function |
|---|---|
| PCMM_Start | Starts processor core management module (PCMM) |
| PCMM_Get_Current_System_Performance | Allows PCMM to obtain performance of CPU |
| PCMM_Get_GraphicsAccelerator_Performance | Allows PCMM to determine current performance of graphics accelerator |
| PCMM_Get_VideoAccelerator_Performance | Allows PCMM to determine current performance of video accelerator |
| PCMM_Map_Post_Processing | Passes core context so that post-processing can be done on selected processing core |

TABLE 2-continued

| API | Function |
| --- | --- |
| PCMM_Map_Pre_Processing | Passes core context so that pre-processing can be done on selected processing core |
| PCMM_Set_Profiling_parameters | Allows OpenMAX IL to change and set profiling parameters |
| PCMM_Stop | Stops the PCMM |

Various embodiments can be implemented in digital electronic circuitry, or in computer hardware, firmware, software, or in combinations of them. Embodiments can be implemented in a computer program product tangibly embodied in a machine-readable storage device for execution by a programmable processor; and method steps can be performed by a programmable processor executing a program of instructions to perform functions by operating on input data and generating output. Embodiments can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, it will be understood that various modifications may be made without departing from the scope of the disclosure. For example, implementations can provide 3D graphics and video effects for maps and locations displayed by portable navigation devices and the like. Accordingly, other implementations are within the scope of the following claims.

What is claimed is:

1. An apparatus, comprising:
a processing core performance monitoring module configured to receive an indication of a performance level of each of a plurality of processing cores, the plurality of processing cores comprising a central processing unit (CPU), a video accelerator, and a graphics accelerator;
a CPU performance monitoring module configured to receive the indication of the performance level of the CPU;
a video accelerator performance monitoring module configured to receive the indication of the performance level of the video accelerator;
a graphics accelerator performance monitoring module configured to receive the indication of the performance level of the graphics accelerator;
a processor core management module configured to:
map a multimedia workload to one of a plurality of predetermined allocation policies based on i) a detected type of the multimedia workload, and ii) predetermined performance level thresholds associated with each of the video accelerator, the graphics accelerator, and the CPU, wherein each of the predetermined allocation policies identifies a selected one of the video accelerator, the graphics accelerator, and the CPU to receive the multimedia workload, and wherein the detected type is one of a plurality of types including at least two of a graphics workload, a video decoding workload, and a video encoding workload; and
dynamically allocate pre-processing tasks and post-processing tasks of the multimedia workload to any one of the video accelerator, the graphics accelerator, and the CPU based on i) the one of the plurality of predetermined allocation policies, and ii) current performance levels of each of the video accelerator, the graphics accelerator, and the CPU; and
a lookup table configured to correlate the predetermined allocation policies to the predetermined performance level thresholds.

2. The apparatus of claim 1, further comprising:
a multimedia workload monitoring module configured to detect the multimedia workload, wherein the processor core management module is further configured to dynamically allocate the pre-processing tasks and the post-processing tasks of the multimedia workload in response to the multimedia workload monitoring module.

3. The apparatus of claim 1, further comprising:
a CPU performance reporting module configured to provide the indication of the performance level of the CPU;
a video accelerator performance reporting module configured to provide the indication of the performance level of the video accelerator; and
a graphics accelerator performance reporting module configured to provide the indication of the performance level of the graphics accelerator.

4. The apparatus of claim 1, wherein the multimedia workload comprises at least one of:
a video workload;
a graphics workload; and
a speech recognition workload.

5. The apparatus of claim 1, wherein the pre-processing tasks comprise at least one of:
video stabilization;
noise reduction;
contrast enhancement; and
temporal filtering.

6. The apparatus of claim 1, wherein the post-processing tasks comprise at least one of:
deblocking filtering;
deringing filtering;
de-interlacing;
clipping;
resizing; and
rotating.

7. The apparatus of claim 1, wherein the performance level of each of the plurality of processing cores corresponds to at least one of:
current performance;

current available performance; and
predicted future performance.

8. The apparatus of claim 1, wherein the performance level of each of the plurality of processing cores corresponds to at least one of:
   processing performance; and
   power consumption.

9. The apparatus of claim 1, further comprising:
   the CPU;
   the video accelerator; and
   the graphics accelerator.

10. A processing device comprising the apparatus of claim 9.

11. A portable navigation device comprising the apparatus of claim 9, wherein the multimedia workload includes 3D graphics and video effects for maps and locations displayed by the portable navigation device.

12. An integrated circuit comprising the apparatus of claim 9.

13. A method, comprising:
   receiving, at a processing core performance monitoring module, an indication of a performance level of each of a plurality of processing cores, the plurality of processing cores comprising a central processing unit (CPU), a video accelerator, and a graphics accelerator;
   receiving, at the CPU, the indication of a performance level of the CPU;
   receiving, at the video accelerator, the indication of a performance level of the video accelerator;
   receiving, at the graphics accelerator, the indication of a performance level of the graphics accelerator;
   mapping a multimedia workload to one of a plurality of predetermined allocation policies based on i) a detected type of the multimedia workload, and ii) predetermined performance level thresholds associated with each of the video accelerator, the graphics accelerator, and the CPU, wherein each of the predetermined allocation policies identifies a selected one of the video accelerator, the graphics accelerator, and the CPU to receive the multimedia workload, and wherein the detected type is one of a plurality of types including at least two of a graphics workload, a video decoding workload, and a video encoding workload;
   correlating, using a lookup table, the predetermined allocation policies to the predetermined performance level thresholds; and
   dynamically allocating pre-processing tasks and post-processing tasks of the multimedia workload to any one of the video accelerator, the graphics accelerator, and the CPU based on i) the one of the plurality of predetermined allocation policies, and ii) current performance levels of each of the video accelerator, the graphics accelerator, and the CPU.

14. The method of claim 13, further comprising:
   detecting the multimedia workload; and
   dynamically allocating the pre-processing tasks and the post-processing tasks of the multimedia workload in response to detecting the multimedia workload.

15. The method of claim 13, further comprising:
   providing the indication of the performance level of the CPU;
   providing the indication of the performance level of the video accelerator; and
   providing the indication of the performance level of the graphics accelerator.

16. The method of claim 13, wherein the multimedia workload comprises at least one of:
   a video workload;
   a graphics workload; and
   a speech recognition workload.

17. The method of claim 13, wherein the pre-processing tasks comprise at least one of:
   video stabilization;
   noise reduction;
   contrast enhancement; and
   temporal filtering.

18. The method of claim 13, wherein the post-processing tasks comprise at least one of:
   deblocking filtering;
   deringing filtering;
   de-interlacing;
   clipping;
   resizing; and
   rotating.

19. The method of claim 13, wherein the performance level of each of the plurality of processing cores corresponds to at least one of:
   current performance;
   current available performance; and
   predicted future performance.

20. The method of claim 13, wherein the performance level of each of the plurality of processing cores corresponds to at least one of:
   processing performance; and
   power consumption.

* * * * *